K. FARKAS.
WELDING METALLIC FILAMENTS TO LEAD WIRES.
APPLICATION FILED OCT. 4, 1909.
975,845.
Patented Nov. 15, 1910.
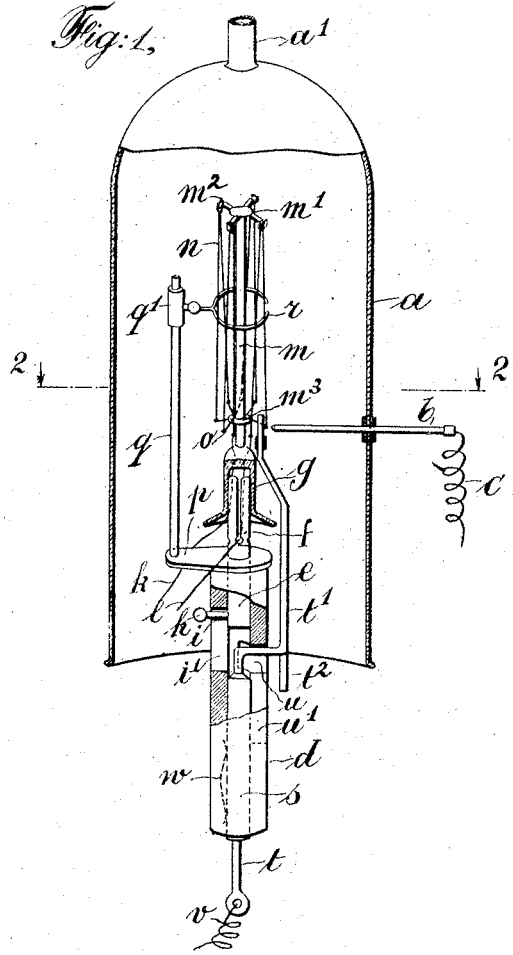
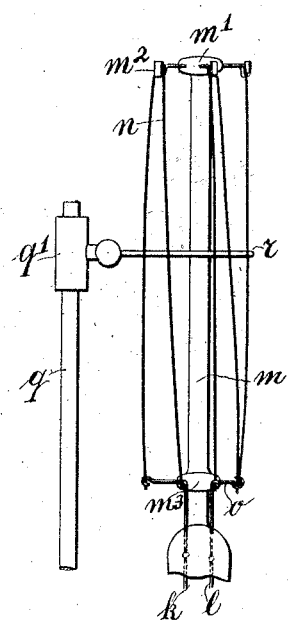
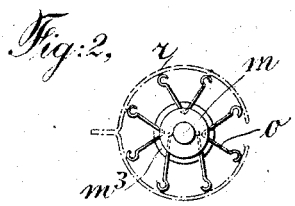
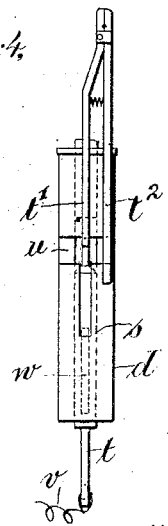
Witnesses:
Flora Greenwald.
Alfred Lyons.
Inventor
Karl Farkas
By his Attorney
L. K. Böhm.

UNITED STATES PATENT OFFICE.

KARL FARKAS, OF NEW YORK, N. Y., ASSIGNOR OF ONE-HALF TO GUY V. WILLIAMS, OF NEW YORK, N. Y.

WELDING METALLIC FILAMENTS TO LEAD-WIRES.

975,845.  Specification of Letters Patent.  Patented Nov. 15, 1910.

Application filed October 4, 1909. Serial No. 520,882.

*To all whom it may concern:*

Be it known that I, KARL FARKAS, a citizen of the Kingdom of Hungary, and a resident of New York, in the county and State of New York, have invented certain new and useful Improvements in Welding Metallic Filaments to Lead-Wires, of which the following is a specification.

This invention has reference to improvements in welding or fusing metallic filaments to the lead wires and filament supports of incandescent electric lamps. Such filaments of which the tungsten filament is the foremost representative, consist of metals like tungsten which are infusible by the currents employed in incandescent lighting. The leads and filament supports however consist of metals having a relatively low melting point. Therefore when connecting or welding the filament ends to the ends of these leads and supports the latter fuse forming a small globule or bead around the end of the filament. The welding of metallic filaments to leads and supports requires great care but a person skilled in this special art may fuse the metallic filament to the lead or support in an open glass vessel containing air just as platinum wires are fused to copper wires in the open air by means of a glass blower's blow pipe. With less skill or somewhat careless help however it is advisable to introduce an inert gas into the receiver. Such gas should preferably be incombustible and of an elementary nature as for instance nitrogen which is chemically inert and inactive. The small arc necessary for the welding even can not produce any trace of any nitrous oxid because in the nitrogen atmosphere there is no oxygen nor is surface oxidation of the globule and of the end of the filament possible. For this reason the presence of a reducing gas such as hydrogen is usually unnecessary. Compound gases, such as carbon dioxid are not so desirable as the elementary nitrogen because traces of carbon dioxid for instance may be decomposed into carbon and oxygen by the action of the arc and a slight surface oxidation may result and some carbon may mix with the fusing metal. This appears to be the case because reducing hydrogen is sometimes employed in connection with the compound gas such as carbon dioxid in process of fusing metallic filaments to leads and supports.

In order to render the welding or fusing of metallic filaments to leads or supports economical I have devised a novel apparatus by means of which the filaments are fused to the leads and supports in a quick and reliable manner. While heretofore two separate electrodes were employed for fusing the filaments to the leads and supports which electrodes formed part of the circuit when operated I employ but one electrode and complete the circuit during operation by my novel apparatus. This renders the use of the apparatus safe because but one electrode has to be guided and watched by the operator. In addition to these main objects as above outlined the novel apparatus is rather small and neat so that the welding of the filaments to the leads and supports may conveniently and quickly be effected, all as will be fully described hereinafter with reference to the accompanying drawing in which:

Figure 1 represents in perspective view, mostly in section an apparatus for welding metallic filaments to leads and supports embodying in desirable form the present improvements. Fig. 2 is a sectional view on line 2, 2 of Fig. 1. Fig. 3 is a detail view on an enlarged scale, and Fig. 4 is another detail view on an enlarged scale.

Similar characters of reference denote like parts in all the figures.

On the drawing $a$ represents a receiver of glass having a narrow neck $a^1$ at the top through which an inert gas, such as nitrogen, may be supplied. This receiver is open at the bottom. Through the side wall of the receiver a pointed carbon rod $b$ is mounted rectangularly to said side wall. This pointed carbon rod forms one electrode of the device as indicated by the wire $c$ attached to its outer end.

The device for fusing the metallic filament to its supports and the leads consists essentially of a hollow handle $d$ made of insulating material. In the upper hollow portion of the handle a rod or tube $e$ is mounted having on its upper end a number of flat springs $f$ circularly arranged as shown in Fig. 1. These springs are purposed to receive the hollow glass stem $g$ which carries the filaments. A button $h$ is in rigid connection with the rod or tube $e$ and extends through a semi-annular slot $i$ in the hollow handle. This slot has centrally a downward extension $i^1$ thus forming a T shaped slot. By means of the button $h$ the rod $e$ with the springs $f$ thereto attached and everything mounted on said springs may be turned horizontally to the extent of 180° by means of the semi-annular horizontal slot $i$. The rod $e$ may also be shifted up and down by means of the vertical portion $i^1$ of the slot $i$. The glass stem $g$ carries the leads $k, l$. To the solid top portion of the stem a glass rod $m$ is fused having at the top a small glass rim $m^1$ to which are connected by the fusion of the glass the elastic anchors $m^2$ with hooks at the end in which the single metallic filaments $n$ rest in the usual manner. Near the bottom end of the glass rod a second rim $m^3$ is formed with conductive filament supports $o$ shown on an enlarged scale in Fig. 2. The filament ends hang loosely in the hooks of the supports $o$ before they are welded thereto. At the top of the hollow handle there is a horizontal bracket or support $p$ extending sidewise and carrying near the outer end a vertical rod $q$ on which a sleeve $q^1$ is provided which may be moved up and down by friction. This sleeve supports a wire ring $r$ which is open at the outer end and adapted to be placed both in a horizontal and vertical position.

The second electrode of the device is formed by part of the apparatus. In the lower portion of the hollow handle there is a tube $s$ to which is rigidly connected a conductive rod $t$. This rod extends beyond the member $s$ and then horizontally through a slot $u$ in the handle which is of same construction and size as the slot $i$ above described and having a lower vertical portion $u^1$. The rod $t$ then extends vertically up forming one member $t^1$ of a clamping device with a second member $t^2$. It is self evident from the above that the clamping device may be horizontally turned to the extent of 180° in the horizontal portion $u$ of the T shaped slot through which it passes. It may also be moved up and down in the vertical portion $u^1$ of said slot. The clamp forms the second electrode of the device as indicated by the wire $v$ connected to the bottom end of the rod $t$.

When the device is to be used the ring $r$ is placed in a vertical position. Then the glass stem $g$ carrying the metal filament is placed on the springs $f$, care being taken that the ring $r$ passes between two filaments. Now the ring $r$ is turned into a horizontal position, as shown in Fig. 3, whereby the filaments are somewhat bulged out and make contact with the hooks of the supports $o$. The device with stem and filaments is then placed into the receiver containing the inert gas and the clamp forming the second electrode is moved up and one support clamped. Now the device is brought near to the carbon electrode $b$ in such manner that the hook of the clamped support $o$ comes near the carbon electrode whereby the arc is formed and the hooks fused into a small globule or bead embedding the end of the filament. Upon withdrawing the device or moving it sidewise the circuit is broken. The clamp is now opened, moved downwardly in its T shaped slot and sidewise so that the next support may be clamped and fused to the end of the filament. The device is kept in position by means of a flat spring $w$ shown in Figs. 1 and 4. When the clamp has arrived at the end of the horizontal portion $u$ of its slot the button $h$ is operated for the purpose of completing the circle in which the filaments are mounted. This button may be moved up and down for the purpose of bringing the ring $r$ into the desired position.

I claim as my invention:

1. An appliance for welding electric conductors to metallic filaments, comprising a supporting member for the filament carrying stem, an electrode operatively connected to said supporting member, and a second electrode for forming the small fusing arc.

2. An appliance for welding electric conductors to metallic filaments, comprising a supporting member, an electrode and support clamp operatively connected to the supporting member and forming a permanent part thereof, and a second electrode for forming the small fusing arc.

3. An appliance for welding electric conductors to metallic filaments, comprising a supporting member, a clamp for said conductors operatively connected to said supporting member and forming one electrode, and a stationary second electrode for forming the small fusing arc when the first electrode is close by.

4. An appliance for welding electric conductors to metallic filaments, comprising a supporting member for the filament carrying stem, means thereon for slightly bulging out the filaments to make contact with the conductors, a clamp for the electric conductors operatively and permanently connected to the supporting member and forming an electrode, and a second electrode for forming the small fusing arc.

5. An appliance for welding electric conductors to metallic filaments, comprising a supporting member for the filament carrying stem, an adjustable open ring with support on said supporting member adapted to be placed in a horizontal and vertical position for slightly bulging out the filament, a clamp for the electric conductors operatively and permanently connected to the supporting member and forming an electrode, and a second electrode for forming the small fusing arc.

6. An appliance for welding electric conductors to metallic filaments, comprising a receiver having means for introducing an inert gas, a permanent electrode passing through the side wall of said receiver, a separate supporting member for the filament carrying stem, a clamp for the electric conductors operatively and permanently connected to said supporting member forming the second electrode.

7. An appliance for welding electric conductors to the free ends of metallic filaments, comprising a receiver, a permanent electrode passing through the side wall of said receiver, a supporting member for the filament carrying stem, means thereon for slightly bulging out the filaments to make contact with the conductors, and a clamp for said conductors operatively and permanently connected to the supporting member forming a second electrode.

8. An appliance for welding supporting electric conductors to the ends of metallic filaments, comprising a hollow handle of insulating material having a T shaped slot in its upper portion and a like slot in its lower portion, a slidable member within the upper slot with means for supporting the filament carrying stem, a slidable member in its lower portion passing through the lower slot, and a clamp in connection therewith, both said slidable member and clamp forming an electrode in permanent operative connection with the handle, an adjustable open ring with support secured to the top of the handle for slightly bulging out the filaments, and a second electrode.

9. An appliance for welding supporting electric conductors to the ends of metallic filaments, comprising a hollow handle of insulating material having a T shaped slot in its upper portion and a like slot in its lower portion, a slidable member within the upper slot with means for supporting the filament carrying stem, a slidable member in its lower portion passing through the lower slot, and a clamp in connection therewith, both said slidable member and clamp forming an electrode in permanent operative connection with the handle, an adjustable open ring with support secured to the top of the handle for slightly bulging out the filaments, a receiver, and a second electrode passing through the side wall of said receiver.

Signed at New York, N. Y., this 2nd day of October, 1909.

KARL FARKAS.

Witnesses:
LUDWIG K. BÖHM,
ALFRED LYONS.